United States Patent [19]

Wallace et al.

[11] 4,301,473
[45] Nov. 17, 1981

[54] METHOD AND APPARATUS FOR VIDEO SIGNAL RESOLUTION ENHANCEMENT

[75] Inventors: Kurt F. Wallace, Redwood City; Greg G. Frye, San Leandro; David A. Grayson, Sunnyvale, all of Calif.

[73] Assignee: Atari, Inc., Sunnyvale, Calif.

[21] Appl. No.: 123,864

[22] Filed: Feb. 22, 1980

[51] Int. Cl.³ .......................... H04N 3/24; H04N 5/14
[52] U.S. Cl. .................................... 358/166; 358/242
[58] Field of Search ............... 358/166, 242, 138, 165, 358/150, 37, 33, 21; 315/383–386

[56] References Cited

U.S. PATENT DOCUMENTS 2,798,114  7/1957  Schlesinger ..................... 358/138
4,228,459 10/1980  Smith ............................ 358/112

Primary Examiner—John C. Martin
Attorney, Agent, or Firm—Townsend and Townsend

[57] ABSTRACT

The resolution of relatively low resolution type information signals is enhanced by inserting black level signals between adjacent picture elements at predetermined positions in each odd horizontal scanning line, and inserting black level signals between adjacent picture elements at different predetermined positions in even horizontal scanning lines. The black level signals are inserted by extinguishing a CRT beam in accordance with phase displaced clock signal trains, preferably phase displaced by 180°.

12 Claims, 4 Drawing Figures

METHOD AND APPARATUS FOR VIDEO SIGNAL RESOLUTION ENHANCEMENT

BACKGROUND OF THE INVENTION

This invention relates to the field of video signal processing. More specifically, this invention relates to video signal processing to improve the subjective resolution of video-type information signals when displayed on a video screen.

In many information systems employing video-type displays, the video portion of the system is deliberately designed to provide relatively low maximum resolution of the displayed images, for reasons of economy, speed, or both. For example, in some information processing systems using CRT display terminals and in some video games designed for use with a CRT in which alphanumeric characters and relatively large images (such as play field boundaries, partitions and the like) are displayed, only relatively low resolution requirements exist for typical images. As a consequence, the video signal processing circuitry need only provide for relatively low resolution and the system is designed accordingly. A typical example for video processing circuitry implemented in digital form employs three bit digital characters to create the serial lines of video information, and such an implementation provides eight levels of grey scale information.

In some low resolution applications, however, it is desirable to maximize the resolution of some images having more detail than the usual display characters. In the past, improved resolution has been provided by modifying each line of video by averaging the amplitude level of adjacent picture elements (pixels). This technique is primarily employed to reduce or eliminate the effect known as "cogging" which occurs when adjacent picture elements vary widely in luminance levels, the observable effect of which is a sharp or abrupt change throughout the video field, producing a sharp-edged jagged image. While the pixel averaging technique has been found to be somewhat effective, this approach is rather complex to implement successfully and produces an image subjectively possessing a "soft" appearance.

SUMMARY OF THE INVENTION

The invention comprises a method and system for improving the resolution of inherently low resolution video-type information signals, which is simple and inexpensive to implement, and which provides a more subjectively pleasing video image when displayed on a video screen.

From a method standpoint, the invention comprises a method for processing video information type signals comprising the steps of inserting black level signals between adjacent picture elements in a first preselected group of scanning lines at predetermined positions in each line; and inserting black level signals between adjacent picture elements in a second preselected group of scanning lines at different predetermined positions in each line. The steps of inserting are typically performed by merely blanking or extinguishing the CRT beam in accordance with control signals, which preferably comprise a pair of clock signals displaced in phase by a predetermined value. The black level signals are inserted into the first group of scanning lines under control of the first one of the pair of signals, and the black level signals are inserted into the second group of scanning lines under the control of the other one of the pair of clock signals, the clock signals being preferably phase displaced by 180 degrees. In the preferred embodiment of the invention, the first group of scanning lines comprises the even-numbered lines of the field of video, while the second group of scanning lines comprises the odd-numbered lines of the video field.

From a system standpoint, the invention comprises a system for processing video-type information signals to improve the subjective resolution thereof when displayed on a video screen, the system including input means for receiving the video-type signals in a line-by-line format, means for inserting black level signals between adjacent picture elements in each scanning line at regular intervals therealong, and means for varying the line locations at which the black level signals are inserted, whereby the black level signals are inserted in a first preselected group of scanning lines at first predetermined positions in each line and the black level signals are inserted in a second preselected group of scanning lines at second predetermined portions in each line. The varying means preferably includes means for shifting the line locations by 180 degrees between the first and second predetermined groups. In a preferred embodiment of the invention, and varying means includes means for generating a pair of phase displaced clock signals, switch means having first and second input terminals coupled respectively to first and second ones of the clock signal pair and an output terminal coupled to the inserting means; and means for alternately coupling the first and second input terminals to the output terminal at a rate equal to the scanning line rate. In the preferred embodiment, the first group of scan lines comprises the even-numbered lines and the second group of scanning lines comprises the odd-numbered lines of a video field.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
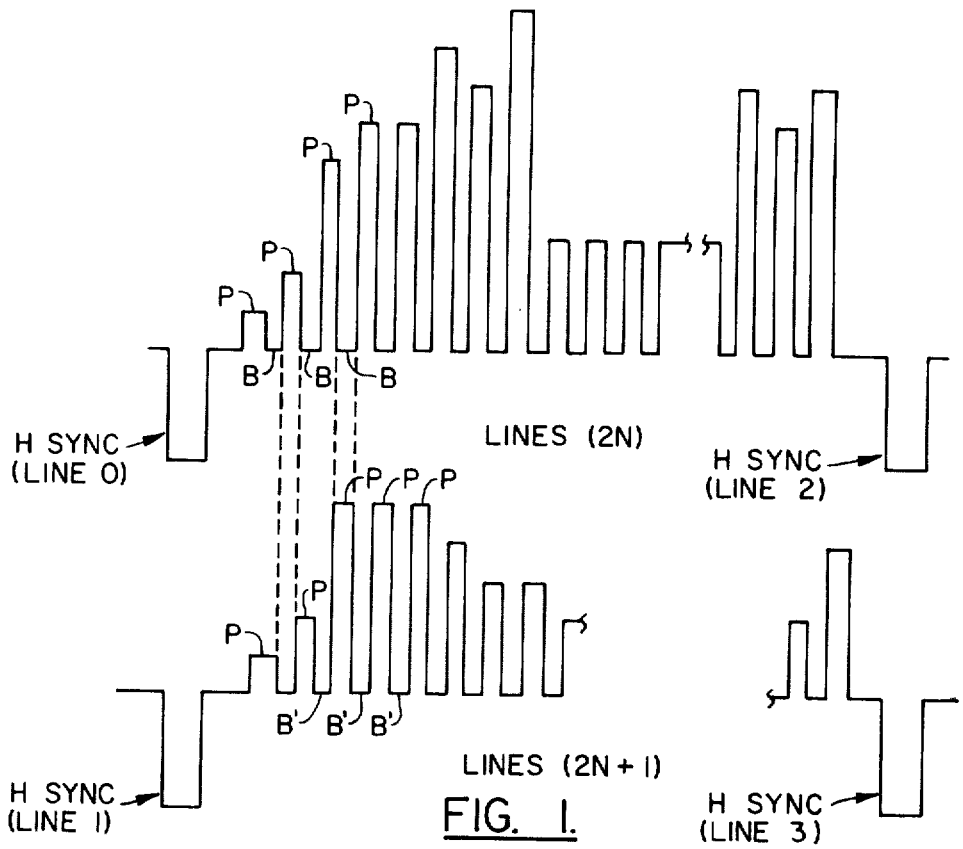
FIG. 1 is a wave form diagram showing even and odd lines and illustrating the invention.

Turning now to the drawings, FIG. 1 is a pair of wave form diagrams illustrating the principle of the invention. As seen in this Figure, even lines (lines 2N) of video information signals are altered by inserting a black level B between adjacent picture elements P at regular intervals. Similarly, odd lines (lines 2N+1) of video information signals are altered by inserting black level signals B' between adjacent picture elements. The inserted black level signal portions B' of the odd video lines are phase displaced from the black level signal portions B of the even lines by a predetermined amount, which in the preferred embodiment is 180 degrees, as indicated by the broken lines illustrated. It is understood that the wave forms illustrated in FIG. 1 are somewhat schematic in nature, and further that the modified scanning lines of video signals will appear in their normal order (e.g., line 0 followed by line 1, followed by line 2, etc.).

Figure 2:
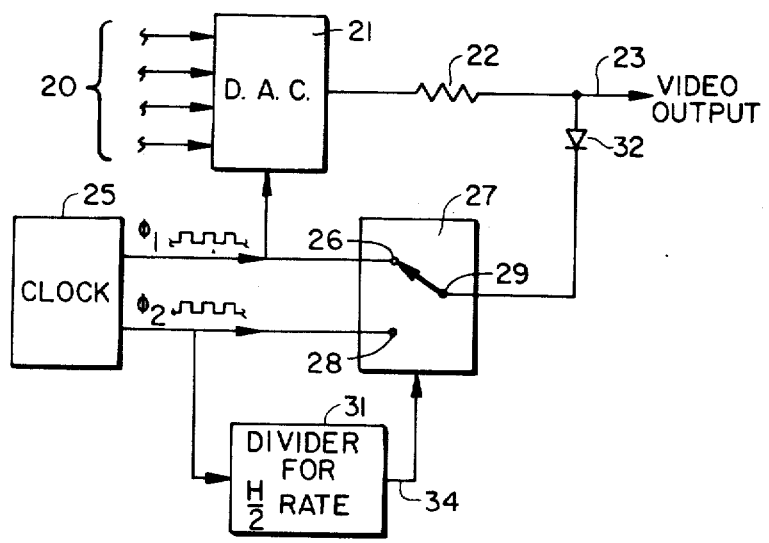
FIG. 2 is a schematic block diagram of a system for implementing the invention.

FIG. 2 illustrates in block diagram form one system for effecting the signal processing of the invention. As seen in this Figure, multi-bit digital video signals are applied to the input terminals of a conventional digital-to-analog converter 21, in which the digital signals are converted to analog form. Those signals output from the converter 21 are coupled via an appropriate impedance 22 to a video output terminal 23, whence the signals are coupled to appropriate follow-on circuitry. Converter 21 is clocked by a clock signal labeled $\Phi_1$, generated by a clock signal generator 25. Clock signal $\Phi_1$ is applied to a first input terminal 26 of a switch 27, which is preferably an electronic switching device, such as a two-phase multiplexer unit. Clock signal generator 25 also generates a second clock signal $\Phi_2$, which is applied to a second input terminal 28 of switch 27, and also to a divider unit 31. In the preferred embodiment, clock signal $\Phi_2$ is substantially identical to clock signal $\Phi_1$, with the exception that the two clock signals are 180 degrees out of phase. In addition, clock signals $\Phi_1$ and $\Phi_2$ have a common frequency sufficiently high to provide the requisite number of minimum samples of the video information, i.e., a frequency equal to or greater than the Nyquist rate. Switch 27 includes an output terminal 29 which is coupled to the cathode of a black level setting diode 32, the anode of which is coupled to the video output terminal 23.

Divider 31 divides down the clock signal $\Phi_2$ in order to provide a switching signal for switch 27 on an output terminal 34. The function of this signal is to alternately couple terminal 26 and terminal 28 to output terminal 29 of switch 27 at the horizonal scanning line rate, i.e., to permit clock signal $\Phi_1$ to operate level setting diode 32 for every other line and to permit clock signal $\Phi_2$ to operate level setting diode 32 for complementary alternate lines.

In operation, incoming video-type information signals present on input terminals 20 are converted by converter 21 into analog signals. Black level signals are inserted into the incoming stream of video by switch 27 and clock signals $\Phi_1$ and $\Phi_2$ in the following manner. Beginning with the first line of video information (line 0), with switch 27 in the configuration illustrated, the black level signals B are inserted into the first line (line 0) by operating level setting diode 32 with clock signals $\Phi_1$. At the end of line 0, the switching signal from divider 31 causes the output terminal 29 of switch 27 to be coupled to input terminal 28. Thereafter, incoming video signals for line 1 are provided with inserted black level signals B' by the operation of level setting diode 32 under control of clock signal $\Phi_2$. At the end of line 1, a switching signal from divider 31 causes the output terminal 29 of switch 27 to be again coupled to input terminal 26, whereupon the black level signals B are inserted into the line 2 video signals by operating level setting diode 32 with clock signal $\Phi_1$. Further operation of the system is as described above.

Figure 3:
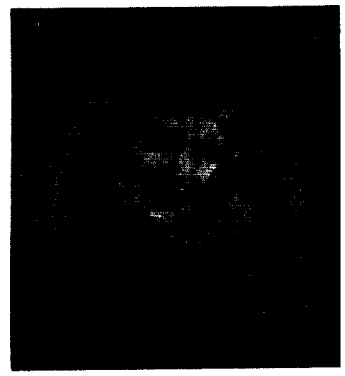
FIG. 3 and FIG. 4 are photographic reproductions illustrating the resolution enhancement provided by the invention.
Figure 4:

The resolution enhancement afforded by the invention is illustrated in FIGS. 3 and 4. FIG. 3 is a photographic reproduction of a portrait image produced with a three-bit digital video system (providing eight levels of grey scale resolution), the image being formed by a 64 by 64 pixel array with each pixel displayed as two horizontal by two vertical timed intervals. The "cog-ging" effect is quite pronounced, particularly about the outline of the image.

FIG. 4 shows the same image after processing of the video information signals according to the invention. As can be seen, the "cogging" effect is substantially reduced and the image is much more subjectively pleasing, without having been unduly "smeared" or "softened" by the processing according to the invention. The subjective effect of processing according to the invention is analogous to placing a diagonal screen grid over the original image.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

We claim:

1. A method of processing video-type information signals to improve the subjective resolution thereof when displayed on a video-screen, said method comprising the steps of:
   inserting black level signals between adjacent picture elements in a first preselected group of scanning lines at predetermined positions in each line; and
   inserting black level signals between adjacent picture elements in a second preselected group of scanning lines interlaced with the first preselected group at other predetermined positions.

2. The method of claim 1 wherein said predetermined positions in said first group of scanning lines are phase displaced by 180 degrees from said predetermined positions in said second group of scanning lines.

3. The method of claim 1 wherein said steps of inserting are performed by extinguishing a beam in a CRT.

4. The method of claim 1 wherein said steps of inserting are performed by generating a pair of clock signals displaced in phase by a predetermined value, controlling the insertion of said black level signals for said first group of scanning lines with a first one of said pair of clock signals, and controlling the insertion of said black level signals for said second group of scanning lines with the other one of said pair of clock signals.

5. The method of claim 4 wherein said clock signals are phase displaced by 180 degrees.

6. The method of claim 1 wherein said first group of scanning lines comprises even-numbered lines of a field of video and wherein said second group of scanning lines comprises odd-numbered lines of said video field.

7. A system for processing video-type information signals to improve the subjective resolution thereof when displayed on a video screen, said system comprising:
   input means for receiving said video-type signals in a line-by-line format;
   means for inserting black level signals between adjacent picture elements in each scanning line at regular intervals therealong; and
   means for inserting the black level signals in a first preselected group of scanning lines at first positions and in a second preselected group of scanning lines interlaced with the first group at other positions.

8. The system of claim 7 wherein said last-named means includes means for shifting the line locations at which said black level signals are inserted by 180 degrees between said first and second preselected groups.

9. The system of claim 7 wherein said last-named means includes means for generating a pair of phase displaced clock signals, means having first and second input terminals coupled respectively to first and second ones of said clock signal pair, an output terminal coupled to the first of said inserting means, and means for alternately coupling said first and second input terminals to said output terminal at a rate equal to the scanning line rate.

10. The system of claim 9 wherein said clock signals are phase displaced by 180 degrees.

11. The system of claim 7 wherein said first group of scanning lines comprises even-numbered lines of a field of video and wherein said second group of scanning lines comprises odd-numbered lines of said video field.

12. A method for electronically superimposing a diagonal black matrix on a raster scan display generated in response to a signal comprising the steps of:

periodically blanking the video signal in a first group of scan lines at times associated with first positions; and periodically blanking the signal in a second group of scan lines interlaced with the first group of scan lines at times corresponding to second positions on the scan lines interlaced with the first positions along the scan axis.

* * * * *